United States Patent [19]
Inokuchi et al.

[11] Patent Number: 5,773,134
[45] Date of Patent: Jun. 30, 1998

[54] THERMOPLASTIC RESIN-BASED COMPOSITE POLYMERIC FILM

[75] Inventors: Yoshinori Inokuchi; Satoshi Kuwata, both of Gunma-Ken, Japan

[73] Assignee: Shin-Etsu Chemical Co., Ltd., Tokyo, Japan

[21] Appl. No.: 742,322

[22] Filed: Nov. 1, 1996

[30] Foreign Application Priority Data

Nov. 2, 1995 [JP] Japan .................................. 7-285722

[51] Int. Cl.[6] ...................................................... B29D 7/00
[52] U.S. Cl. ........................ 428/220; 428/327; 428/331; 428/405; 428/451
[58] Field of Search ................................... 428/327, 331, 428/405, 447, 451, 220

[56] References Cited

U.S. PATENT DOCUMENTS 5,480,715  1/1996  Mills et al. .............................. 428/327

*Primary Examiner*—D. S. Nakarani
*Attorney, Agent, or Firm*—Millen, White, Zelano & Branigan, P. C.

[57] ABSTRACT

Proposed is a thermoplastic resin-based film suitable as a wrapping material having good slipperiness of the surface without decreasing the high transparency and having high resistance against formation of scratches. The resin film is molded from a thermoplastic resin composition comprising a thermoplastic resin such as polypropylene and polycarbonate as the matrix and a specified amount of fine silicone-based composite particles each consisting of a core particle of a silicone rubber having a specified particle diameter and a coating layer thereon in a specified coating amount formed from a polyorganosilsesquioxane such as polymethylsilsesquioxane.

8 Claims, No Drawings

THERMOPLASTIC RESIN-BASED COMPOSITE POLYMERIC FILM

BACKGROUND OF THE INVENTION

The present invention relates to a film molded from a thermoplastic resin-based polymeric composition and having usefulness as a wrapping material for various goods.

Needless to say, wrapping materials, i.e. wrapping films and sheets, are molded in many cases from a thermoplastic synthetic resin. Thermoplastic resin films, however, have serious problems and disadvantages. For example, plastic resin films readily cause blocking when films are stacked one on the other or when films are contacted each with the other under pressure so that troubles are caused in the manufacturing process of plastic resin films unless the winding velocity of molded resin films of a continuous length into a roll or the unwinding velocity of the plastic resin film from a roll is decreased at a great sacrifice of the working efficiency. When bags are made from such a plastic resin film, furthermore, the bag in a folded state suffers from poor openability of the sticking mouth and therefore does not comply with the demand for prompt use of the bag. With an object to solve this problem, proposals and attempts have been made heretofore in order to prevent blocking or sticking of plastic resin films by compounding the thermoplastic resin with various kinds of blocking inhibitors.

The blocking inhibitors heretofore proposed for compounding in propylene-based resins include, for example, an anhydrous active silicic acid powder disclosed in Japanese Patent Publication 39-16908, kaolinite proposed in Japanese Patent Publication 43-24523, fine zeolite particles disclosed in Japanese Patent Publication 52-16134, combination of a silicon dioxide powder and calcium or aluminum salt of a fatty acid proposed in Japanese Patent Kokai 58-225142, inorganic powders having a lamellar structure of particles disclosed in Japanese Patent Kokai 57-18747, fine metal oxide particles produced by the deflagration of metal powder dust proposed in Japanese Patent Publication 6-86557 and so on. Further, the blocking inhibitors to be compounded with a polyester resin heretofore proposed include inorganic fine powders such as silicon oxide, titanium dioxide, calcium carbonate, talc, clay, calcined kaolin and the like disclosed in Japanese Patent Kokai 54-57562, combination of two kinds or more of inorganic inert powders having different average particle diameters each from the others proposed in Japanese Patent Publication 55-40929 and so on.

Although the above mentioned blocking inhibitors are each effective at least to some extent, they have problems that, when the compounding amount thereof in a thermoplastic resin is increased with an object to fully obtain the desired blocking-inhibiting effect, the transparency of the film compounded with such a large amount of the blocking inhibitor is necessarily decreased and the films are susceptible to formation of scratches due to rubbing of the films one with the other. As a remedy for these disadvantages, proposals have been made heretofore by compounding the thermoplastic resin with fine particles of a silicone resin. For example, Japanese Patent Kokai 62-215646, 62-232448 and 62-233248 propose a method of compounding a polypropylene resin with a non-fusible silicone resin powder having a three-dimensional network structure and Japanese Patent Publication 2-41344 proposes a method of compounding the resin with a combination of fine particles of a polymethyl silsesquioxane and a hydroxylated fatty acid glyceride. Polyester resins are compounded with fine particles of an organopolysiloxane compound having organosiloxane units of the formula $CH_3SiO_{3/2}$ as is proposed by Japanese Patent Kokai 3-56538 or with fine particles of an organopolysiloxane compound having organosiloxane units of the formula $CH_3SiO_{3/2}$ and inactive fine particles in combination as is proposed by Japanese Patent Kokai 63-278939, 63-286438 and 3-56538. Japanese Patent Kokai 3-69362 proposes compounding of a polyolefin resin with fine particles of a silicone resin mainly consisting of a dimethyl polysiloxane and fine particles of a fluorinated ethylene-based resin in combination. Further, Japanese Patent Kokai 2-150438 proposes compounding of a thermoplastic resin-based composition with fine particles of a polymethyl silsesquioxane after a surface treatment with a trialkyl silane, trialkyl silanol, trialkyl alkoxy silane, hexaalkyl disilazane and the like. These prior art methods, however, are far from completeness in solving the problems in the prior art.

SUMMARY OF THE INVENTION

The present invention accordingly has an object, in view of the above described problems in the prior art, to provide a polymeric film of a thermoplastic resin-based composition capable of giving a solution for the above described problems in the prior art. Namely, the invention has an object to provide a resin film useful as a general-purpose wrapping film having excellent transparency without decreasing the appearance, having high resistance against scratch formation due to rubbing of films each with the other and exhibiting excellent behavior in practical applications such as high antiblocking behavior and good slipperiness to facilitate high-speed winding works of a continuous-length film after molding as well as high-speed unwinding of a rolled film or to improve the mouth-openability of folded bags made from the resin film.

Thus, the resin film of the invention is a film molded from a resin composition which comprises:

(a) 100 parts by weight of a thermoplastic resin as the matrix; and (b) from 0.01 to 5 parts by weight of particles of a silicone-based composite each consisting of a core particle of a silicone rubber and a coating layer of a polyorganosilsesquioxane and dispersed in the matrix.

DETAILED DESCRIPTION OF THE PREFERRED EMBODIMENTS

The thermoplastic resin forming the matrix of the resin composition from which the inventive film is molded is exemplified by polyolefin resins such as homopolymers of propylene, ethylene, methylpentene and butene as well as copolymers of these olefin monomers, polyester resins such as polyethylene terephthalate, polybutylene terephthalate, polycarbonate and polyallylate as well as copolymers derived from the same monomers as for the above mentioned polyester resins, polyamide resins such as nylon 6, nylon 66, nylon 610, nylon 11 and nylon 12 as well as copolymers of the same monomers as in the above named polyamide resins, homopolymers of vinyl chloride, vinyl acetate, methyl methacrylate and styrene as well as copolymers of these monomers, and so on, of which polyolefin resins and polyester resins are preferable and, in particular, polypropylene and propylene-based copolymers, polyethylene terephthalate and polycarbonate are more preferable.

The particles of a silicone-based composition dispersed in the above described matrix resin are the fine spherical silicone particles disclosed in Japanese Patent Kokai 7-196815. The particles each have a composite structure consisting of a spherical core particle of a silicone rubber and a coating layer thereon formed from a polyorganosilsesquioxane. The core particles have an average particle diameter in the range from 0.1 to 100 μm or, preferably, from 1 to 30 μm. When the average particle diameter of the core particles is too small, the resin film molded from the resin composition cannot be imparted with high anti-blocking resistance while, when the average particle diameter is too large, an undue decrease is caused in the moldability of the resin composition consisting of a thermoplastic resin as the matrix and the particles dispersed in the matrix.

Although it is not always necessary that the core particles of a silicone rubber are coated uniformly over the whole surface with a polyorganosilsesquioxane but the core particles can be coated on a part of the surface, the coating amount of the polyorganosilsesquioxane is in the range from 1 to 500 parts by weight or, preferably, from 2 to 100 parts by weight per 100 parts by weight of the spherical core particles of a silicone rubber. When the coating amount is too small, an adverse influence is caused on the dispersibility of the composite silicone particles in the matrix resin along with a decrease in the anti-blocking resistance of the resin film molded from the resin composition. When the coating amount is too large, the resin films molded from the resin composition compounded with the particles would be subject to formation of scratches by rubbing between film surfaces.

The composite silicone particles can be prepared according to the method disclosed in Japanese Patent Kokai 7-196815 mentioned above. Namely, an organo trialkoxy silane compound such as methyl trimethoxy silane is added to an aqueous dispersion of spherical silicone rubber particles having an average particle diameter of 0.1 to 100 μm together with an alkaline compound or an aqueous solution thereof and subjected to hydrolysis and condensation polymerization in the presence of the silicone rubber particles to form a coating layer of a polyorganosilsesquioxane, e.g., polymethylsilsesquioxane, on the surface of the core particles followed by collection of the coated particles from the aqueous medium and drying of the particles.

The compounding amount of the composite silicone particles in the resin composition is in the range from 0.01 to 5 parts by weight or, preferably, from 0.05 to 0.5 part by weight per 100 parts by weight of the thermoplastic resin as the matrix. When the compounding amount of the composite silicone particles is too small, the resin film molded from the resin composition cannot be imparted with high anti-blocking resistance as a matter of course while, when the compounding amount thereof is too large, a decrease is caused in the transparency of the resin film molded from the resin composition.

The mechanism by which a resin film molded from the resin composition compounded with the composite silicone particles is imparted with unexpectedly high anti-blocking resistance and slipperiness is presumably that the composite silicone particles, which have a spherical particle configuration, present on the film surface have an effect to decrease the actual contacting areas of the contacting films and the surface properties inherent in silicones impart the thermoplastic resin film with excellent surface releasability and anti-blocking resistance.

It is optional according to need that the resin composition, from which the resin film of the invention is molded, is compounded with various kinds of known additives including stabilizers, e.g., antioxidants, ultraviolet absorbers and the like, processing aids, coloring agents, antistatic agents, lubricants, known anti-blocking agents and so on each in a limited amount not to adversely affect the desirable properties of the resin film.

The resin composition from which the inventive resin film is molded can be prepared by uniformly blending the thermoplastic resin and the composite silicone particles each in a specified amount together with optional additives by using a suitable blending machine such as Henschel mixers, V-blenders, ribbon blenders, machine mortars and the like. The thus prepared resin composition can be molded into a resin film by a known molding method such as the T-die method, circular die method, biaxial stretching method and the like. The thickness of the resin film of the invention naturally depends on the particularly intended application of the resin film but is usually in the range from 1 to 300 μm.

In the following, the resin film of the invention is described in more detail by way of Examples, in which the terms of "parts" and "%" always refer to "parts by weight" and "% by weight", respectively, as preceded by the description of the preparation procedure of the spherical composite silicone particles.

Preparation 1

Into a glass beaker of 1 liter capacity were introduced 500 g of a vinyl-terminated dimethyl polysiloxane expressed by the formula

in which Vi is a vinyl group and Me is a methyl group, having a viscosity of 600 centistokes at 25° C. and 20 g of a methyl hydrogen polysiloxane expressed by the formula

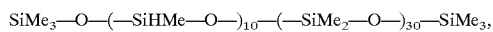

in which Me is a methyl group, having a viscosity of 30 centistokes at 25° C. and they were agitated by using a homomixer rotating at 2000 rpm followed by continued agitation of the mixture after addition of 5 g of a polyoxyethylene (9 moles addition of ethylene oxide) octylphenyl ether and 150 g of water so that phase inversion was noted with an increase of the viscosity. Further, the mixture was admixed with 325 g of water under continued agitation to give an aqueous emulsion of the O/W type.

In the next place, this emulsion was transferred to a glass flask equipped with a stirrer having an anchor blade and agitated therein for 12 hours with addition of 1 g of a toluene solution of a chloroplatinic acid-olefin complex in a concentration of 0.05% by weight as platinum and 1 g of the same polyoxyethylene octylphenyl ether as used above to effect the hydrosilation reaction between the vinyl groups in the vinyl-terminated dimethyl polysiloxane and the silicon-bonded hydrogen atoms of the methyl hydrogen polysiloxane to give an aqueous dispersion of spherical silicone rubber particles, referred to as the aqueous dispersion I hereinafter. The aqueous dispersion I was subjected to the measurement of the average particle diameter of the silicone rubber particles dispersed therein by using a Coulter Counter (manufactured by Coulter Electronics Co.) to obtain a value of 3 μm.

Into a glass beaker of 3 liters capacity were introduced 2290 g of water, 580 g of the aqueous dispersion I prepared above and 60 g of concentrated ammonia water of 28% concentration and the mixture, which had a pH of 11.2, was agitated at 10° C. by using a stirrer having an anchor blade and rotating at 200 rpm. Thereafter, 65 g of methyl trimethoxy silane were added to the mixture dropwise over a period of 20 minutes while the mixture was kept at a temperature of 5° to 15° C. and agitation of the mixture was continued for additional 4 hours followed by heating of the mixture up to a temperature of 55° to 60° C. and continued agitation for additional 1 hour. The thus obtained mixture was filtered through a pressurizable filter to give a cake containing about 30% of water.

The wet cake was dried at 105° C. in a hot air circulation drying oven and the dried cake was disintegrated into particles by using a jet mill. The silicone particles thus obtained were found to have a spherical configuration under an optical microscope. The particles were dispersed in water by using a surface active agent and the average particle diameter thereof was measured by using a Coulter Counter to give a value of 3 μm. The composite silicone particles were subjected to a gravimetric analysis to give a result that the coating amount of the polyorganosilsesquioxane resin was 10 parts per 100 parts of the spherical core particles of the silicone rubber. This composite silicone powder is referred to as the composite powder I hereinafter.

Preparation 2

An aqueous dispersion of fine spherical silicone rubber particles, referred to as the aqueous dispersion II hereinafter, was prepared in the same manner as in the preparation of the aqueous dispersion I described above excepting for a decrease of the amount of the polyoxyethylene octylphenyl ether used in the preparation of the O/W emulsion from 5 g to 1 g. The average particle diameter of the silicone rubber particles in the aqueous dispersion II was 15 μm as determined by using a Coulter Counter. A second composite silicone powder, referred to as the composite powder II hereinafter, was prepared in just the same manner as in the preparation of the composite powder I excepting for the replacement of the aqueous dispersion I with the same amount of the aqueous dispersion II. The particles of the composite powder II had a spherical particle configuration as examined under an optical microscope. The average particle diameter of the composite powder II as dispersed in water by using a surface active agent was 15 μm as measured by using a Coulter Counter. The composite silicone particles were subjected to a gravimetric analysis to give a result that the coating amount of the polyorganosilsesquioxane resin was 10 parts per 100 parts of the spherical core particles of the silicone rubber.

Preparation 3

Into a glass beaker of 3 liters capacity were introduced 2290 g of water, 350 g of the aqueous dispersion I prepared in Preparation 1 and 60 g of concentrated ammonia water of 28% concentration and the mixture, which had a pH of 11.1, was agitated at 10° C. by using a stirrer having an anchor blade and rotating at 200 rpm. Thereafter, 300 g of methyl trimethoxy silane were added to the mixture dropwise over a period of 100 minutes while the mixture was kept at a temperature of 5° to 15° C. and agitation of the mixture was continued for additional 4 hours followed by heating of the mixture up to a temperature of 55° to 60° C. and continued agitation for additional 1 hour. The thus obtained mixture was filtered through a pressurizable filter to give a cake containing about 30% of water.

The wet cake was dried at 105° C. in a hot air circulation drying oven and the dried cake was disintegrated into particles by using a jet mill. The silicone particles thus obtained were found to have a spherical configuration under an optical microscope. The particles were dispersed in water by using a surface active agent and the average particle diameter thereof was measured by using a Coulter Counter to give a value of 4 μm. The composite silicone particles were subjected to a gravimetric analysis to give a result that the coating amount of the polyorganosilsesquioxane resin was 81 parts per 100 parts of the spherical core particles of the silicone rubber. This composite silicone powder is referred to as the composite powder III hereinafter.

Preparation 4

A composite silicone powder, referred to as the composite powder IV hereinafter, was prepared in just the same manner as in the preparation of the composite powder I excepting for the replacement of 65 g of methyl trimethoxy silane with a combination of 55 g of methyl trimethoxy silane and 10 g of 3-glycidyloxypropyl trimethoxy silane. The particles of this composite powder IV were found to have a spherical particle configuration as examined under an optical microscope. The average particle diameter of the particles was 3 μm as measured with a Coulter Counter for an aqueous dispersion thereof prepared by using a surface active agent. The composite silicone particles were subjected to a gravimetric analysis to give a result that the coating amount of the polyorganosilsesquioxane resin was 11 parts per 100 parts of the spherical core particles of the silicone rubber.

Preparation 5

The aqueous dispersion I prepared in Preparation 1 was heated up to a temperature of 90° C. to instabilize the dispersion of the silicone rubber particles followed by filtration of the dispersion through a pressurizable filter to give a wet cake containing about 30% of water. The wet cake was dried at 105° C. in a drying oven to give a silicone rubber powder, of which the particles were found to have a spherical particle configuration under an optical microscope. The average particle diameter of this powder, which is referred to as the silicone powder V hereinafter, was 4 μm as measured with a Coulter Counter for an aqueous dispersion of the particles prepared by using a-surface active agent.

Preparation 6

Into a glass flask of 3 liters capacity were introduced 2445 g of water and 60 g of concentrated ammonia water of 28% concentration to give a diluted ammonia water having a pH of 11.6 at 20° C. While keeping the temperature at 5° to 20° C., 495 g of methyl trimethoxy silane were added dropwise to the ammonia water under agitation with a stirrer rotating at 200 rpm over a period of 3 hours followed by further continued agitation for additional 4 hours to obtain an aqueous dispersion of a polymethylsilsesquioxane. Thereafter, the aqueous dispersion was heated up to a temperature of 55° to 60° C. and agitated for 1 hour followed by filtration of the aqueous dispersion through a pressurizable filter to give a wet cake containing about 30% of water.

The wet cake was dried at 105° C. in a hot air circulation drying oven and the dried cake was disintegrated by using a jet mill to give a powder of the polymethylsilsesquioxane, of which the particles were found to have a spherical particle configuration under an optical microscope. The average particle diameter of this powder, which is referred to as the silicone powder VI hereinafter, was 2 μm as measured with a Coulter Counter for an aqueous dispersion of the particles prepared by using a surface active agent.

EXAMPLE 1

A thermoplastic resin composition in the form of pellets was prepared by uniformly blending 100 parts of a polypropylene resin (Mitsubishi Poly-Pro MA-3, a product by Mitsubishi Yuka Co.) with 0.1 part of the composite silicone powder I and extruding the blend through the die of a blending extruder machine with unidirectionally rotating dual screws followed by chopping the extruded material using a water-cooled cutting machine. The pellets were molded by injection molding into 80 mm by 50 mm rectangular plate of 1.2 mm thickness, which was evaluated for the transparency as mentioned below. Further, the pellets were molded by the T-die extrusion method into a continuous-length film of 50 μm thickness having a width of 100 mm, which was subjected to the evaluation tests of the surface slipperiness and resistance against scratch formation as mentioned below. The testing methods for the evaluation of these properties are as follows and the results are shown in Table 1 below.

Transparency of resin plate:

The appearance of the resin plate was visually inspected to record the results in three ratings of A, B and C according to the following criteria.

A: transparency as good as that of the control plate molded from the polypropylene resin alone B: very slight whitening C: clearly noticeable whitening Surface slipperiness:

Coefficient of static friction between films was measured by using a dynamic-friction tester (manufactured by Toyo Seiki Co.) at a pulling velocity of 100 mm/minute under a load of 2.0 kgf.

Resistance against scratches:

Two films under contacting were rubbed each with the other by 10 times of reciprocating movement under a load of 5.0 kgf and the rubbed surfaces were visually inspected to record the results in two ratings of A, when no scratches were detected, and B, when whitish scratches were detected.

EXAMPLES 2 TO 7 AND COMPARATIVE EXAMPLES 1 TO 3

The experimental procedures for the preparation of the test specimens and for the evaluation tests were just the same as in Example 1 excepting for an increase or decrease of the amount of the composite silicone powder I (Examples 2 to 4 and Comparative Example 1), replacement of 0.1 part of the composite silicone powder I with one of the composite silicone powders II to IV (Examples 5 to 7) and silicone powders V and VI (Comparative Examples 2 and 3) each in an amount indicated in Table 1. The results of the evaluation tests are shown in Table 1.

TABLE 1

| | Silicone powder | | Properties | | |
| --- | --- | --- | --- | --- | --- |
| | No. | Amount, parts | Transparency | Friction coefficient | Scratch resistance |
| Example | | | | | |
| 1 | I | 0.1 | A | 0.21 | A |
| 2 | I | 0.2 | A | 0.20 | A |
| 3 | I | 0.5 | B | 0.17 | A |
| 4 | I | 0.05 | A | 0.23 | A |
| 5 | II | 0.1 | A | 0.21 | A |
| 6 | III | 0.1 | B | 0.20 | A |
| 7 | IV | 0.1 | A | 0.21 | A |

TABLE 1-continued

| | Silicone powder | | Properties | | |
| --- | --- | --- | --- | --- | --- |
| | No. | Amount, parts | Transparency | Friction coefficient | Scratch resistance |
| Comparative Example | | | | | |
| 1 | I | 0.008 | A | 0.27 | A |
| 2 | V | 0.1 | C | 0.28 | A |
| 3 | VI | 0.1 | C | 0.21 | B |
| Control | — | — | A | 0.29 | A |

EXAMPLES 8 TO 14 AND COMPARATIVE EXAMPLE 4 TO 6

The formulation of the plastic resin compositions in each of Examples 8 to 14 and Comparative Example 4 to 6 was just the same as the formulation of the resin compositions prepared in each of Examples 1 to 7 and Comparative Example 1 to 3, respectively, excepting for the replacement of the polypropylene resin with the same amount of a polycarbonate resin (Panlite L-1250, a product by Teijin Kasei Co.). The results of the evaluation tests, of which the testing procedures were also the same as in the preceding Examples, are shown in Table 2 below which also includes the data for the control specimens prepared from the polycarbonate resin as such.

TABLE 2

| | Silicone powder | | Properties | | |
| --- | --- | --- | --- | --- | --- |
| | No. | Amount, parts | Transparency | Friction coefficient | Scratch resistance |
| Example | | | | | |
| 8 | I | 0.1 | A | 0.20 | A |
| 9 | I | 0.2 | B | 0.20 | A |
| 10 | I | 0.5 | B | 0.18 | A |
| 11 | I | 0.05 | A | 0.22 | A |
| 12 | II | 0.1 | A | 0.20 | A |
| 13 | III | 0.1 | A | 0.19 | A |
| 14 | IV | 0.1 | A | 0.20 | A |
| Comparative Example | | | | | |
| 4 | I | 0.008 | A | 0.30 | A |
| 5 | V | 0.1 | B | 0.29 | A |
| 6 | VI | 0.1 | C | 0.23 | B |
| Control | — | — | A | 0.30 | A |

What is claimed is:

1. A resin film molded from a thermoplastic resin composition which comprises:

(a) 100 parts by weight of a thermoplastic resin as a matrix; and (b) from 0.01 to 5 parts by weight of silicon-based composite particles each consisting of a spherical core particle of a silicone rubber having an average particle diameter in the range from 0.1 to 100 μm and a coating layer of a polyorganosilsesquioxane, dispersed in the matrix wherein the coating amount of the polyorganosilsesquioxane coating layer on the core particles is in the range from 1 to 500 parts by weight per 100 parts by weight of the core particles.

2. The resin film as claimed in claim 1 in which the thermoplastic resin is selected from the group consisting of polypropylene, copolymeric resins of propylene with ethylene, methylpentene or butene, polyethylene terephthalate resin and polycarbonate resins.

3. The resin film as claimed in claim 1 in which the core particles have an average particle diameter in the range from 1 to 30 μm.

4. The resin film as claimed in claim 1 in which the coating amount of the polyorganosilsesquioxane on the core particles is in the range from 2 to 100 parts by weight per 100 parts by weight of the core particles.

5. The resin film as claimed in claim 1 in which the amount of the silicone-based composite particles is in the range from 0.05 to 0.5 part by weight per 100 parts by weight of the thermoplastic resin.

6. The resin film as claimed in claim 1 in which the polyorganosilsesquioxane is a polymethylsilsesquioxane.

7. The resin film of claim 1, wherein the thermoplastic resin is a polyolefin, polyester, polyamide, vinyl chloride polymer, vinyl acetate polymer, methyl methacrylate polymer or styrene polymer.

8. The resin film of claim 1, wherein the thickness of the resin film is from 1 to 300 μm.

* * * * *